United States Patent
Lee (10) Patent No.: US 10,041,969 B2
(45) Date of Patent: Aug. 7, 2018

(54) ACCELERATION SENSOR AND MANUFACTURING METHOD THEREOF

(71) Applicant: Hyundai Motor Company, Seoul (KR)

(72) Inventor: Hiwon Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 182 days.

(21) Appl. No.: 15/182,349

(22) Filed: Jun. 14, 2016

(65) Prior Publication Data

US 2017/0168083 A1   Jun. 15, 2017

(30) Foreign Application Priority Data

Dec. 20, 2015   (KR) .......................... 10-2015-0178546

(51) Int. Cl.
*G01P 15/125* (2006.01)
*G01P 15/18* (2013.01)
*G01P 15/08* (2006.01)

(52) U.S. Cl.
CPC ............ *G01P 15/125* (2013.01); *G01P 15/18* (2013.01); *G01P 2015/084* (2013.01)

(58) Field of Classification Search
CPC .............................................. G01P 2015/084
USPC ..... 73/514.32, 514.38, 1.38, 514.23, 504.04, 73/504.12, 862.041–862.046; 438/50
See application file for complete search history.

(56) References Cited

U.S. PATENT DOCUMENTS 8,739,626 B2 *   6/2014   Acar .................. G01C 19/5712
                                                              73/504.04
8,752,430 B2     6/2014   Burghardt et al.

2007/0034007 A1 *   2/2007   Acar ................... G01P 15/0888
                                                              73/514.01
2009/0199637 A1 *   8/2009   Sugiura et al. ...... G01P 15/0802
                                                              73/514.32
2010/0126270 A1 *   5/2010   Terada et al. ....... G01C 19/5719
                                                              73/504.12
2014/0299947 A1   10/2014   Jeanroy
2014/0361348 A1 *  12/2014   Yoneoka et al. ... G01C 19/5762
                                                              257/254

FOREIGN PATENT DOCUMENTS

KR        10-0327619 B1      3/2002
KR     10-2011-0011625 A     2/2011

* cited by examiner

*Primary Examiner* — Lisa Caputo
*Assistant Examiner* — Roger Hernandez-Prewit
(74) *Attorney, Agent, or Firm* — Mintz Levin Cohn Ferris Glovsky and Popeo, P.C.; Peter F. Corless (57) ABSTRACT

An acceleration sensor includes: a moving electrode extending in at least one of a first direction and a second direction perpendicular to the first direction, and including a plurality of planar patterns connected with each other; and an opposing electrode forming a capacitance with the moving electrode, wherein the plurality of planar patterns include: a first frame pattern; a first anchor pattern fixing the moving electrode to a surrounding structure; a first spring pattern connecting the first frame pattern and the first anchor pattern and having a stretching direction of the first direction; a second spring pattern connecting the first frame pattern and the first anchor pattern and having a stretching direction of the second direction; a wing pattern; and a third spring pattern connecting the first frame pattern and the wing pattern and having a stretching direction of a third direction perpendicular to the first and second directions.

18 Claims, 8 Drawing Sheets

ACCELERATION SENSOR AND MANUFACTURING METHOD THEREOF

CROSS-REFERENCE TO RELATED APPLICATION

This application claims under 35 U.S.C. § 119(a) the benefit of Korean Patent Application No. 10-2015-0178546 filed in the Korean Intellectual Property Office on Dec. 14, 2015, the entire contents of which are incorporated herein by reference.

BACKGROUND (a) Field of the Invention

The present invention relates to an acceleration sensor and a manufacturing method thereof.

(b) Description of the Related Art

An acceleration sensor may determine whether an object connected to the acceleration sensor receives a force in any direction by measuring an inertial force applied in a predetermined direction. Conventionally, a mechanical acceleration sensor including a weight has been used, and an acceleration sensor of a micro-electro-mechanical systems (MEMS) type that may be manufactured through a semiconductor process has recently been used.

However, since a manufacturing process of the acceleration sensor of the MEMS type vertically transfers a structure to be cut out in a vertical direction, there is a problem that it is difficult to construct a delicate structure in the vertical direction compared with a planar direction. Accordingly, when high precision is not required, the acceleration sensor of the planar direction may be vertically mounted to measure movement of the vertical direction. However, when applying this method, an error may be generated in an assembly process, and there is a problem that the structure may be weak against impact or vibration.

Accordingly, an acceleration sensor capable of measuring acceleration in both the horizontal and vertical directions and being easily manufactured, and a manufacturing method thereof, are required.

The above information disclosed in this Background section is only for enhancement of understanding of the background of the invention and therefore it may contain information that does not form the prior art that is already known in this country to a person of ordinary skill in the art.

SUMMARY

The present invention provides an acceleration sensor that may measure acceleration in both the horizontal and vertical directions and may be easily manufactured, and a manufacturing method thereof.

An acceleration sensor according to an exemplary embodiment of the present invention includes: a moving electrode extending in at least one of a first direction and a second direction perpendicular to the first direction, and including a plurality of planar patterns connected with each other; and an opposing electrode forming a capacitance with the moving electrode, wherein the plurality of planar patterns include: a first frame pattern; a first anchor pattern fixing the moving electrode to a surrounding structure; a first spring pattern connecting the first frame pattern and the first anchor pattern and having a stretching direction of the first direction; a second spring pattern connecting the first frame pattern and the first anchor pattern and having a stretching direction of the second direction; a wing pattern; and a third spring pattern connecting the first frame pattern and the wing pattern and having a stretching direction of a third direction perpendicular to the first and second directions, and acceleration is measured depending on a change of the capacitance.

The opposing electrode may be in plural, the opposing electrode may be selected depending on a measuring target direction among the first, second, and third directions, and the acceleration of the measuring target direction may be measured depending on the change of the capacitance between the selected opposing electrode and the moving electrode.

The third spring pattern may have a shape enclosing an outer part of the wing pattern.

The third spring pattern may be connected with a center of the wing pattern.

The first frame pattern may be connected with the first spring pattern in the first direction and may be connected with the second spring pattern in the second direction.

The first anchor pattern and the first frame pattern may be in plural, and the first anchor pattern may be positioned between two adjacent first frame patterns.

The plurality of planar patterns may further include: a second anchor pattern fixing the moving electrode to the surrounding structure; a second frame pattern positioned between the second anchor pattern and the first anchor pattern corresponding to the second anchor pattern; a fourth spring pattern connecting the first anchor pattern and the second frame pattern; and a fifth spring pattern connecting the second frame pattern and the second anchor pattern.

The second frame pattern may include a plurality of comb-tooth electrodes.

The plurality of comb-tooth electrodes may extend in the direction perpendicular to the direction connecting the first anchor pattern and the second anchor pattern.

The plurality of planar patterns may have the same material composition.

A method for manufacturing an acceleration sensor according to an exemplary embodiment of the present invention includes: forming a planar electrode layer; and patterning the planar electrode layer to form a moving electrode by using one mask, wherein the moving electrode extends in at least one of a first direction and a second direction perpendicular to the first direction and includes a plurality of planar patterns connected with each other; and wherein the plurality of planar patterns include: a first frame pattern; a first anchor pattern fixing the moving electrode to a surrounding structure; a first spring pattern connecting the first frame pattern and the first anchor pattern and having a stretching direction of the first direction; a second spring pattern connecting the first frame pattern and the first anchor pattern and having a stretching direction of the second direction; a wing pattern; and a third spring pattern connecting the first frame pattern and the wing pattern and having a stretching direction of a third direction perpendicular to the first and second directions.

In the step of forming the moving electrode, an opposing electrode forming the capacitance with the moving electrode may be formed together therewith.

The third spring pattern may be formed of a shape enclosing an outer part of the wing pattern.

The third spring pattern may be connected to a center of the wing pattern.

The first frame pattern may be connected with the first spring pattern in the first direction and may be connected with the second spring pattern in the second direction.

The first anchor pattern and the first frame pattern may be in plural, and the first anchor pattern may be positioned between two adjacent first frame patterns.

The plurality of planar pattern may further include: a second anchor pattern fixing the moving electrode to the surrounding structure; a second frame pattern positioned between the second anchor pattern and the first anchor pattern corresponding to the second anchor pattern; a fourth spring pattern connecting the first anchor pattern and the second frame pattern; and a fifth spring pattern connecting the second frame pattern and the second anchor pattern.

The second frame pattern may include a plurality of comb-tooth electrodes.

The plurality of comb-tooth electrodes may extend in the direction perpendicular to the direction connecting the first anchor pattern and the second anchor pattern.

The plurality of planar patterns may have the same material composition.

According to an exemplary embodiment of the present invention, the acceleration sensor that may measure the acceleration in both the horizontal and vertical directions and may be easily manufactured, and the manufacturing method thereof, may be provided.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

An acceleration sensor includes a moving electrode and an opposing electrode. As the acceleration sensor moves, the moving electrode receives an inertial force such that the position thereof is changed and a capacitance between the moving electrode and the opposing electrode is changed. If the change direction of the capacitance and the change amount are measured, the acceleration of the target to be measured by the acceleration sensor may be calculated.

Figure 1A:
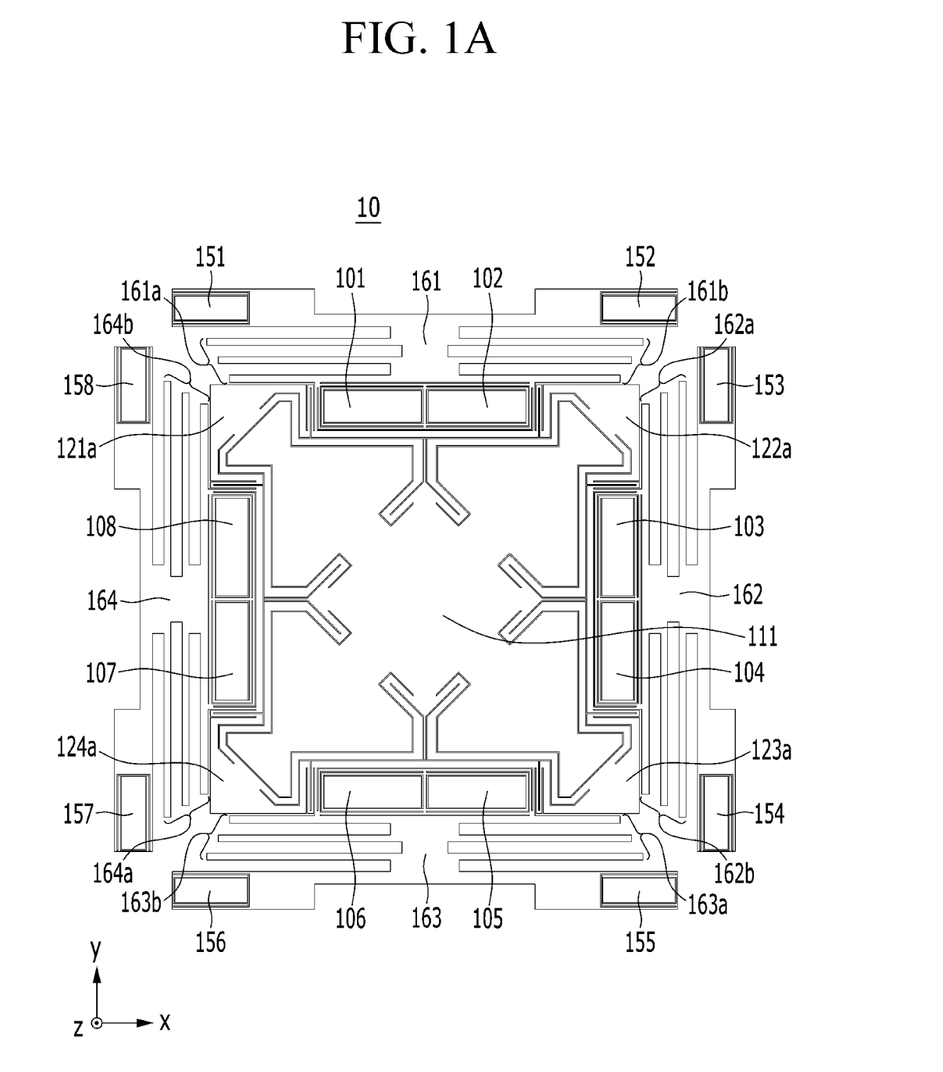
FIGS. 1A and 1B are plan views showing a moving electrode according to an exemplary embodiment of the present invention.
Figure 1B:
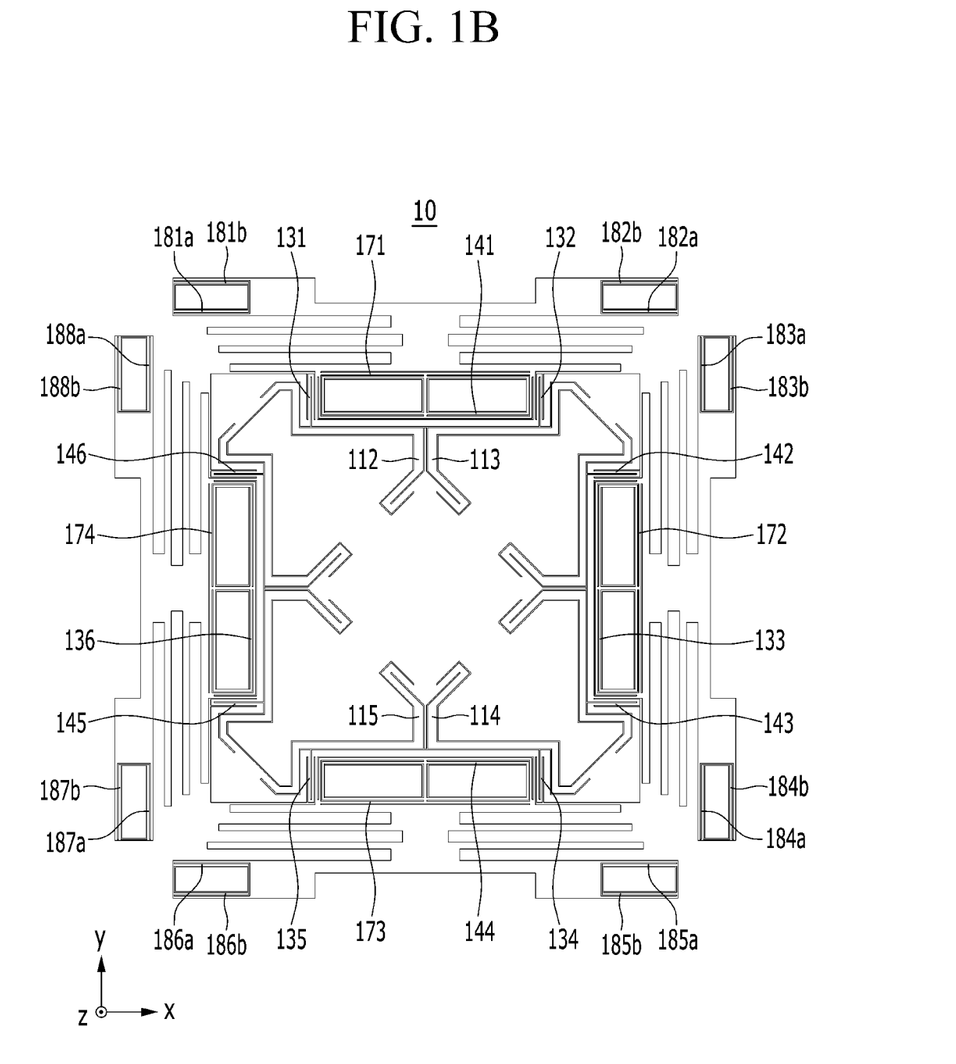

FIGS. 1A and 1B are views showing a moving electrode according to an exemplary embodiment of the present invention.

A moving electrode 10 according to an exemplary embodiment of the present invention includes a plurality of planar patterns connected with each other. That is, the plurality of planar patterns extending in at least one of a first direction x and a second direction y perpendicular to the first direction x are connected with each other to configure the moving electrode 10. A third direction z is perpendicular to the first and second directions x and y. That is, in the present exemplary embodiment, a planar direction is defined by the first and second directions x and y, and a perpendicular direction is defined by the third direction z.

According to an exemplary embodiment, the moving electrode 10 may be formed all at once by etching a planar electrode layer that is previously provided by using a mask. The etching method using the mask may be applied with a conventional art such as lithography. That is, the plurality of planar patterns of the present exemplary embodiment are not connected with each other after being separately formed, but the plurality of planar patterns preferably are patterned all at once by using one mask such that a manufacturing process is simplified, thereby reducing production costs.

Referring to FIGS. 1A and 1B, the plurality of planar patterns respectively include a first anchor pattern (101, 102, 103, 104, 105, 106, 107, and 108), a wing pattern 111, a first frame pattern (121a, 122a, 123a, and 124a), a first spring pattern (131, 132, 133, 134, 135, and 136), a second spring pattern (141, 142, 143, 144, 145, and 146), a third spring pattern (112, 113, 114, and 115), a fourth spring pattern (171, 172, 173, and 174), a fifth spring pattern (181a, 181b, 182a, 182b, 183a, 183b, 184a, 184b, 185a, 185b, 186a, 186b, 187a, 187b, 188a, and 188b), a second anchor pattern (151, 152, 153, 154, 155, 156, 157, and 158), and a second frame pattern (161, 162, 163, and 164).

The first anchor pattern (101, 102, 103, 104, 105, 106, 107, and 108) fixes the moving electrode 10 to a surrounding structure. The first anchor pattern (101, 102, 103, 104, 105, 106, 107, and 108) has a function of supporting the moving electrode 10, and the position thereof is fixed to the moving electrode 10 without influence of inertial movement. Accordingly, the moving electrode 10 may be inertially-moved in the first, second, and third directions x, y, and z for a reference position of the first anchor pattern (101, 102, 103, 104, 105, 106, 107, and 108). In the present exemplary embodiment, to be inertially-moved or moved in the first direction x means to be inertially-moved or moved in a direction −x opposite to the first direction x. Similarly, in the present exemplary embodiment, to be inertially-moved or moved in the second direction y means to be inertially-moved or moved in a direction −y opposite to the second direction y, and to be inertially-moved or moved in the third direction z means to be inertially-moved or moved in a direction −z opposite to the third direction z.

The first frame pattern (121a, 122a, 123a, and 124a) may be connected to the first spring pattern (131, 132, 133, 134, 135, and 136), the second spring pattern (141, 142, 143, 144, 145, and 146), and the third spring pattern (112, 113, 114, and 115). The first frame pattern (121a, 122a, 123a, and 124a) may offset the contracting movement of the spring patterns in the different directions to not interfere in the center. That is, the first frame pattern (121a, 122a, 123a, and 124a) may separate the inertial movement of the first direction x, the inertial movement of the second direction y, and the inertial movement of the third direction z of the moving electrode 10 from each other.

The first spring pattern (131, 132, 133, 134, 135, and 136) connects the first frame pattern (121a, 122a, 123a, and 124a) and the first anchor pattern (101, 102, 103, 104, 105, 106, 107, and 108), and the stretching direction is the first direction x. Accordingly, the first spring pattern (131, 132, 133, 134, 135, and 136) mainly contributes to the inertial movement of the first direction x of the moving electrode 10.

In detail, the first spring pattern 131 may connect the first frame pattern 121a and the first anchor pattern 101, the first spring pattern 132 may connect the first frame pattern 122a and the first anchor pattern 102, the first spring pattern 133 may connect the first frame patterns 122a and 123a and the first anchor patterns 103 and 104, the first spring pattern 134 may connect the first frame pattern 123a and the first anchor pattern 105, the first spring pattern 135 may connect the first frame pattern 124a and the first anchor pattern 106, and the first spring pattern 136 may connect the first frame patterns 121a and 124a and the first anchor patterns 107 and 108.

In the exemplary embodiment of FIGS. 1A and 1B, the first spring pattern 133 is connected with the first frame pattern 122a through the second spring pattern 142 and is connected with the first frame pattern 123a through the second spring pattern 143. However, in another exemplary embodiment, the first spring pattern 133 may be directly and independently connected to the first frame patterns 122a and 123a without the connection with the second spring patterns 142 and 143. The first spring pattern 136 may also be realized as another similar exemplary embodiment.

The second spring pattern (141, 142, 143, 144, 145, and 146) connects the first frame pattern (121a, 122a, 123a, and 124a) and the first anchor pattern (101, 102, 103, 104, 105, 106, 107, and 108), and the stretching direction is the second direction y. Accordingly, the second spring pattern mainly contributes to the inertial movement of the second direction y of the moving electrode 10.

In detail, the second spring pattern 141 may connect the first frame patterns 121a and 122a and the first anchor patterns 101 and 102, the second spring pattern 142 may connect the first frame pattern 122a and the first anchor pattern 103, the second spring pattern 143 may connect the first frame pattern 123a and the first anchor pattern 104, the second spring pattern 144 may connect the first frame patterns 123a and 124a and the first anchor patterns 105 and 106, the second spring pattern 145 may connect the first frame pattern 124a and the first anchor pattern 107, and the second spring pattern 146 may connect the first frame pattern 121a and the first anchor pattern 108.

In the exemplary embodiment of FIGS. 1A and 1B, the second spring pattern 141 is connected with the first frame pattern 121a through the first spring pattern 131 and is connected with the first frame pattern 122a through the first spring pattern 132. However, in another exemplary embodiment, the second spring pattern 141 may be directly and independently connected to the first frame patterns 121a and 122a without being connected with the second spring patterns 131 and 132. The second spring pattern 144 may be realized as another similar exemplary embodiment.

The wing pattern 111 may be inertially-moved in the third direction z through the third spring pattern (112, 113, 114, and 115). The wing pattern 111 has a relatively wide area compared with other patterns, and may form the capacitance with the opposing electrode facing thereto in the third direction z. The opposing electrode will be described in detail with reference to FIGS. 2A and 2B.

The third spring pattern (112, 113, 114, and 115) connects the first frame pattern (121a, 122a, 123a, and 124a) and the wing pattern 111, and the stretching direction is the third direction z perpendicular to the first and second directions x and y. The third spring pattern (112, 113, 114, and 115) may be connected to the center of the wing pattern 111.

In detail, the third spring pattern 112 may connect the first frame pattern 121a and the wing pattern 111, the third spring pattern 113 may connect the first frame pattern 122a and the wing pattern 111, the third spring pattern 114 may connect the first frame pattern 123a and the wing pattern 111, and the third spring pattern 115 may connect the first frame pattern 124a and the wing pattern 111.

The third spring pattern (112, 113, 114, and 115) may have a shape enclosing the outer part of the wing pattern 111.

The first frame pattern (121a, 122a, 123a, and 124a) may be connected with the first spring pattern (131, 132, 133, 134, 135, and 136) in the first direction x, and the first frame pattern (121a, 122a, 123a, and 124a) is connected with the second spring pattern (141, 142, 143, 144, 145, and 146) in the second direction y. In the exemplary embodiment of FIGS. 1A and 1B, the first frame pattern (121a, 122a, 123a, and 124a) may be positioned in a manner to be disposed at a vertex of a quadrangle.

The first anchor pattern (101, 102, 103, 104, 105, 106, 107, and 108) may be positioned between two adjacent first frame patterns (121a, 122a, 123a, and 124a).

In detail, the first anchor patterns 101 and 102 may be positioned between two adjacent first frame patterns 121a and 122a, the first anchor patterns 103 and 104 may be positioned between two adjacent first frame patterns 122a and 123a, the first anchor patterns 105 and 106 may be positioned between two adjacent first frame patterns 123a and 124a, and the first anchor patterns 107 and 108 may be positioned between two adjacent first frame patterns 124a and 121a.

The second anchor pattern (151, 152, 153, 154, 155, 156, 157, and 158) may fix the moving electrode 10 to the surrounding structure. The second anchor pattern (151, 152, 153, 154, 155, 156, 157, and 158) has a similar function to the first anchor pattern (101, 102, 103, 104, 105, 106, 107, and 108) such that the description thereof is omitted for convenience.

The second frame pattern (161, 162, 163, and 164) may be positioned between the second anchor pattern (151, 152, 153, 154, 155, 156, 157, and 158) and the corresponding first anchor pattern (101, 102, 103, 104, 105, 106, 107, and 108).

In detail, the second frame pattern 161 may be positioned between the second anchor patterns 151 and 152 and the first anchor patterns 101 and 102, the second frame pattern 162 may be positioned between the second anchor patterns 153 and 154 and the first anchor patterns 103 and 104, the second frame pattern 163 may be positioned between the second anchor patterns 155 and 156 and the first anchor patterns 105 and 106, and the second frame pattern 164 may be positioned between the second anchor patterns 157 and 158 and the first anchor patterns 107 and 108.

The second frame pattern (161, 162, 163, and 164) may include a plurality of comb-tooth electrodes (161a, 161b, 162a, 162b, 163a, 163b, 164a, and 164b). The plurality of comb-tooth electrodes (161a, 161b, 162a, 162b, 163a, 163b, 164a, and 164b) may extend in the direction perpendicular to the direction connecting the first anchor pattern (101, 102, 103, 104, 105, 106, 107, and 108) and the second anchor pattern (151, 152, 153, 154, 155, 156, 157, and 158).

In detail, the plurality of comb-tooth electrodes 161a and 161b of the second frame pattern 161 may extend in the direction perpendicular to the direction connecting the first anchor patterns 101 and 102 and the second anchor patterns 151 and 152, the plurality of comb-tooth electrodes 162a and 162b of the second frame pattern 162 may extend in the direction perpendicular to the direction connecting the first anchor patterns 103 and 104 and the second anchor patterns 153 and 154, the plurality of comb-tooth electrodes 163a and 163b of the second frame pattern 163 may extend in the direction perpendicular to the direction connecting the first anchor patterns 105 and 106 and the second anchor patterns 155 and 156, and the plurality of comb-tooth electrodes 164a and 164b of the second frame pattern 164 may extend in the direction perpendicular to the direction connecting the first anchor patterns 107 and 108 and the second anchor patterns 157 and 158.

The plurality of comb-tooth electrodes (161a, 161b, 162a, 162b, 163a, 163b, 164a, and 164b) extend the facing area between opposing electrodes (21, 22, 31, and 32) described later and the moving electrode 10, thereby extending the capacitance between the moving electrode 10 and the opposing electrodes 21, 22, 31, and 32 (referring to FIG. 2A).

The fourth spring pattern (171, 172, 173, and 174) may connect the first anchor pattern (101, 102, 103, 104, 105, 106, 107, and 108) and the second frame pattern (161, 162, 163, and 164).

In detail, the fourth spring pattern 171 may connect the first anchor patterns 101 and 102 and the second frame pattern 161, the fourth spring pattern 172 may connect the first anchor patterns 103 and 104 and the second frame pattern 162, the fourth spring pattern 173 may connect the first anchor patterns 105 and 106 and the second frame pattern 163, and the fourth spring pattern 174 may connect the first anchor patterns 107 and 108 and the second frame pattern 164.

The stretching direction of the fourth spring patterns 171 and 173 may be the second direction y, and the stretching direction of the fourth spring patterns 172 and 174 may be the first direction x.

The fifth spring pattern (181a, 181b, 182a, 182b, 183a, 183b, 184a, 184b, 185a, 185b, 186a, 186b, 187a, 187b, 188a, and 188b) may connect the second frame pattern (161, 162, 163, and 164) and the second anchor pattern (151, 152, 153, 154, 155, 156, 157, and 158).

In detail, the fifth spring patterns 181a and 181b may connect the second frame pattern 161 and the second anchor pattern 151, the fifth spring patterns 182a and 182b may connect the second frame pattern 161 and the second anchor pattern 152, the fifth spring patterns 183a and 183b may connect the second frame pattern 162 and the second anchor pattern 153, the fifth spring patterns 184a and 184b may connect the second frame pattern 162 and the second anchor pattern 154, the fifth spring patterns 185a and 185b may connect the second frame pattern 163 and the second anchor pattern 155, the fifth spring patterns 186a and 186b may connect the second frame pattern 163 and the second anchor pattern 156, the fifth spring patterns 187a and 187b may connect the second frame pattern 164 and the second anchor pattern 157, and the fifth spring patterns 188a and 188b may connect the second frame pattern 164 and the second anchor pattern 158.

The stretching direction of the fifth spring pattern (181a, 181b, 182a, 182b, 185a, 185b, 186a, and 186b) may be the second direction y, and the stretching direction of the fifth spring pattern (183a, 183b, 184a, 184b, 187a, 187b, 188a, and 188b) may be the first direction x.

The plurality of planar patterns may have the same material composition. As described above, the plurality of planar patterns may be formed by patterning one planar electrode layer, thereby having the same material composition.

Figure 2A:
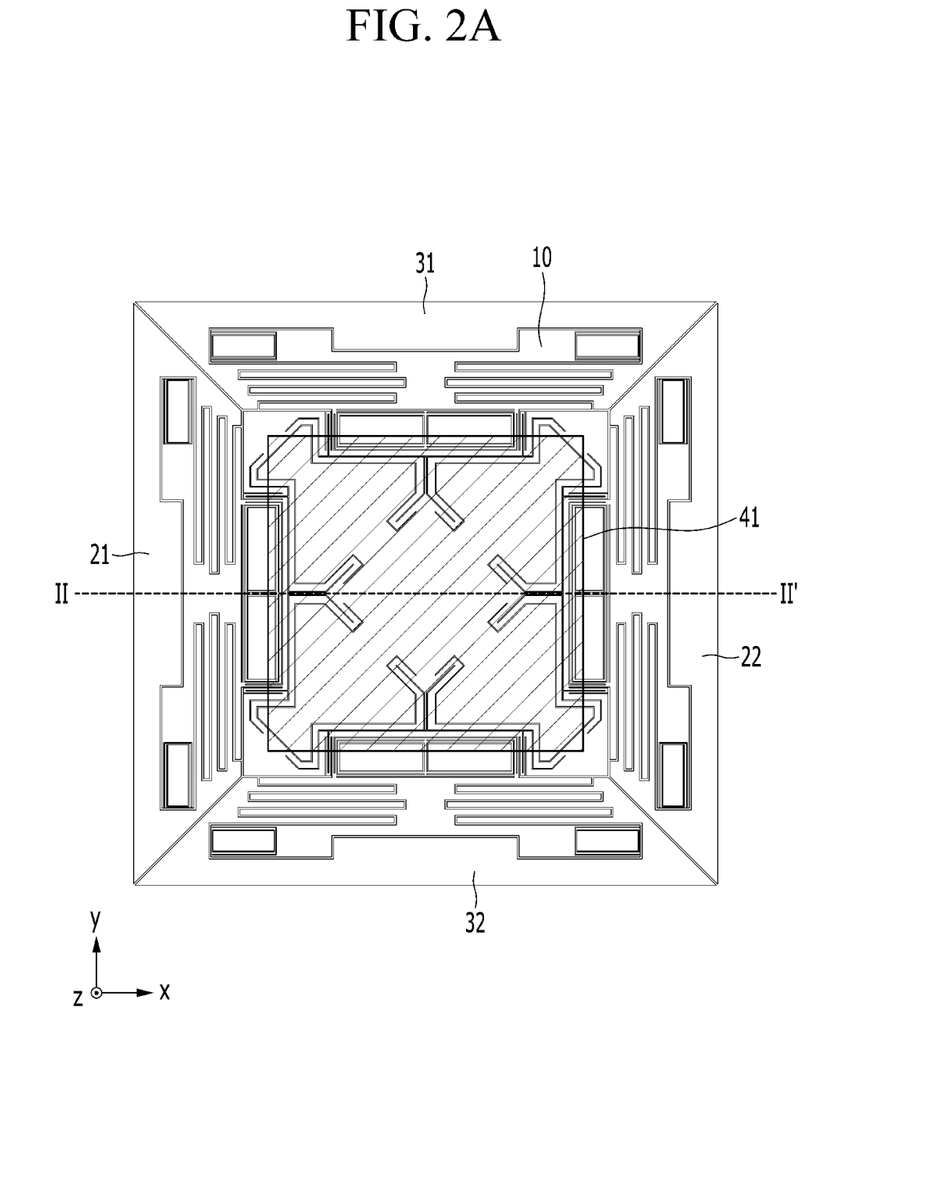
FIGS. 2A and 2B are plan and cross-sectional side views, respectively, showing a relative arrangement of a moving electrode and an opposing electrode according to an exemplary embodiment of the present invention.
Figure 2B:
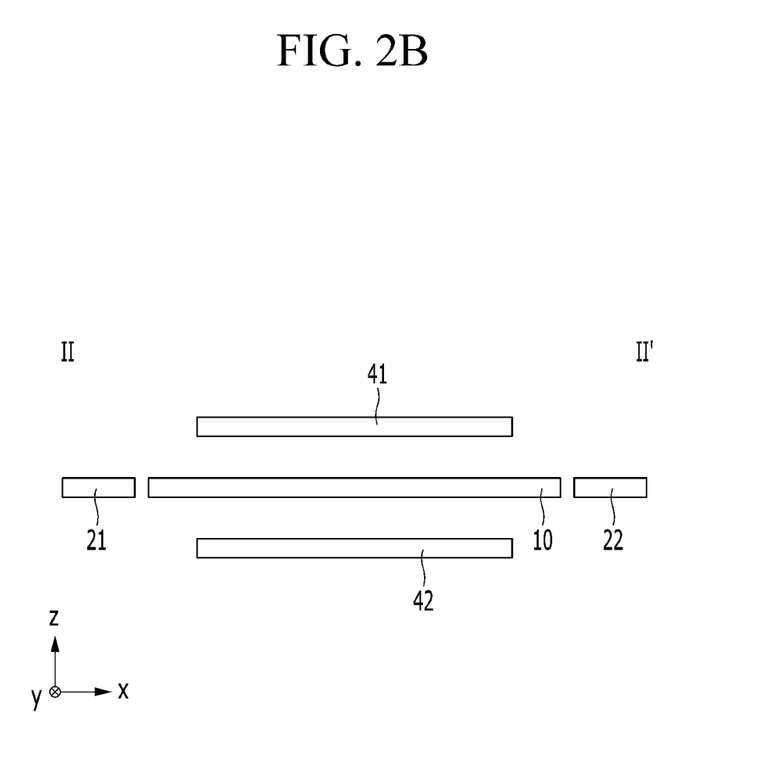

FIGS. 2A and 2B are views showing a relative arrangement of a moving electrode and an opposing electrode according to an exemplary embodiment of the present invention.

Referring to FIGS. 2A and 2b, the acceleration sensor includes the moving electrode 10 and the opposing electrodes 21, 22, 31, 32, 41, and 42. The opposing electrodes 21 and 22 may be positioned to face the moving electrode 10 in the first direction x. The opposing electrodes 31 and 32 may be positioned to face the moving electrode 10 in the second direction y. The opposing electrodes 41 and 42 may be positioned to face the moving electrode 10 in the third direction z.

The opposing electrode (21, 22, 31, 32, 41, and 42) forms the capacitance with the moving electrode 10. The acceleration sensor measures the acceleration based on the capacitance that is changed depending on the inertial force applied to the acceleration sensor. In detail, the opposing electrode (21, 22, 31, 32, 41, and 42) is selected depending on the measuring target direction among the first, second, and third directions x, y, and z and the capacitance change between the selected opposing electrode and the moving electrode 10 is detected, thereby measuring the acceleration for the measuring target direction.

For example, when measuring the acceleration of the first direction x, if the capacitance between the opposing electrode 21 and the moving electrode 10 is decreased and the capacitance between the opposing electrode 22 and the moving electrode 10 is increased, it may be determined that the moving electrode is moved in the first direction x depending on the inertial force. If the capacitance between the opposing electrode 21 and the moving electrode 10 is increased and the capacitance between the opposing electrode 22 and the moving electrode 10 is decreased, it may be determined that the moving electrode is moved in the opposite direction −x of the first direction x depending on the inertial force.

When measuring the acceleration of the second direction y, if the capacitance between the opposing electrode 32 and the moving electrode 10 is decreased and the capacitance between the opposing electrode 31 and the moving electrode 10 is increased, it may be determined that the moving electrode is moved in the second direction y depending on the inertial force. If the capacitance between the opposing electrode 32 and the moving electrode 10 is increased and the capacitance between the opposing electrode 31 and the moving electrode 10 is decreased, it may be determined that the moving electrode is moved in the opposite direction −y of the second direction y depending on the inertial force.

When measuring the acceleration of the third direction z, if the capacitance between the opposing electrode 42 and the moving electrode 10 is decreased and the capacitance between the opposing electrode 41 and the moving electrode 10 is increased, it may be determined that the moving electrode is moved in the third direction z depending on the inertial force. If the capacitance between the opposing electrode 42 and the moving electrode 10 is increased and the capacitance between the opposing electrode 41 and the moving electrode 10 is decreased, it may be determined that the moving electrode is moved in the opposite direction −z of the third direction z depending on the inertial force.

The comb-tooth electrode (161*a*, 161*b*, 162*a*, 162*b*, 163*a*, 163*b*, 164*a*, and 164*b*) of the second frame pattern (161, 162, 163, and 164) expands the facing area between the opposing electrode (21, 22, 31, and 32) and the moving electrode 10, thereby increasing the capacitance between the moving electrode 10 and the opposing electrode (21, 22, 31, and 32) (referring to FIG. 1A).

The comb-tooth electrode (161*a*, 161*b*, 163*a*, and 163*b*) may extend the facing area between the opposing electrode (31 and 32) and the moving electrode 10, and the comb-tooth electrode (162*a*, 162*b*, 164*a*, and 164*b*) may extend the facing area between the opposing electrode (21 and 22) and the moving electrode 10.

Accordingly, the facing area of the first and second directions x and y that is relatively smaller than the facing area of the third direction z may be extended by the comb-tooth electrode (161*a*, 161*b*, 162*a*, 162*b*, 163*a*, 163*b*, 164*a*, and 164*b*). The opposing electrode (21, 22, 31, and 32) that may be positioned on the same plane as the moving electrode 10 may be patterned together therewith when patterning the moving electrode 10. That is, one above-described planar electrode layer may be patterned into the moving electrode 10 and the opposing electrode (21, 22, 31, and 32) at one time by using one mask.

Figure 3:
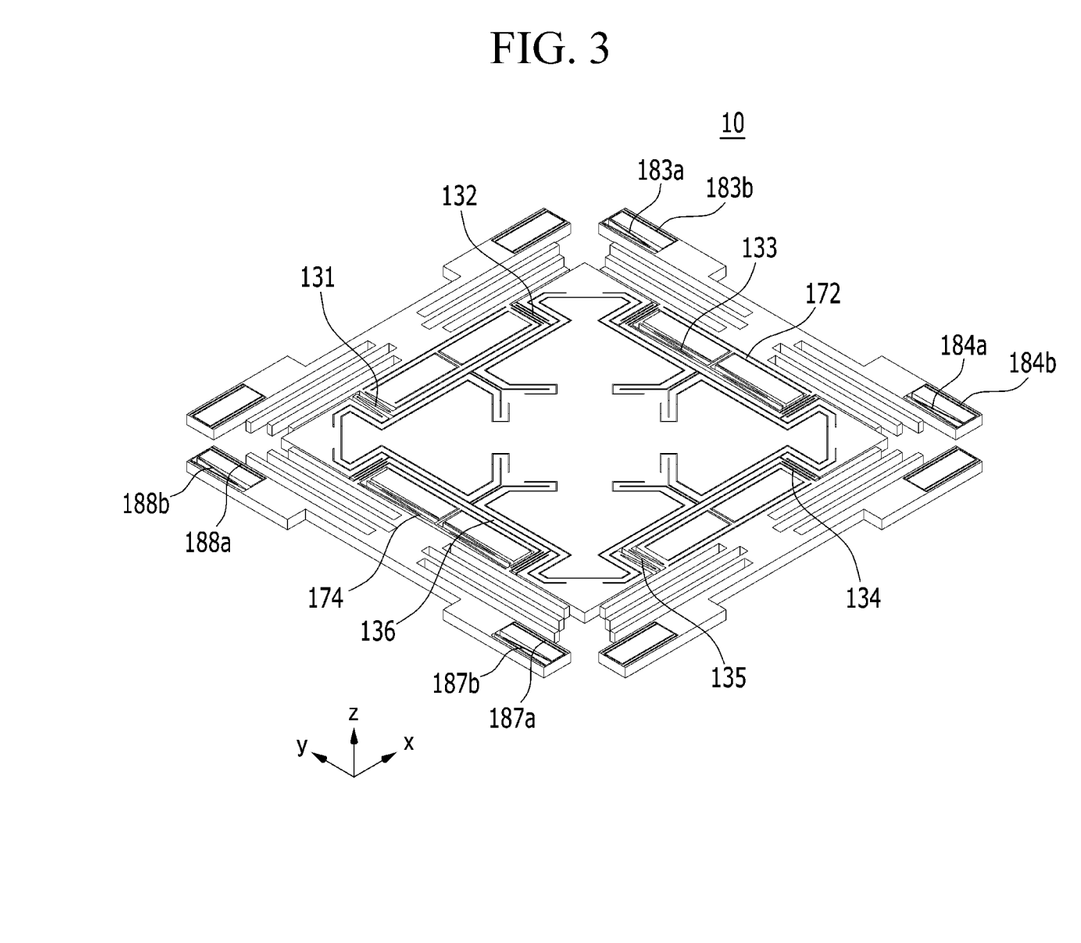
FIG. 3 is a perspective view illustrating a case in which an acceleration sensor moves in a first direction.

FIG. 3 is a view depicting a case in which an acceleration sensor moves in a first direction.

Since the acceleration sensor is moved in the first direction x, the moving electrode 10 is moved in the opposite direction −x of the first direction x depending on the inertial force.

Referring to FIG. 3, as the moving electrode 10 is moved in the opposite direction −x of the first direction x, it may be confirmed that the first spring pattern (131, 133, and 135), the fourth spring pattern 174, and the fifth spring pattern (188*b*, 187*b*, 183*a*, and 184*a*) are stretched, and the first spring pattern (132, 134, and 136), the fourth spring pattern 172, and the fifth spring pattern (188*a*, 187*a*, 183*b*, and 184*b*) are reduced.

In this case, the second spring pattern (141, 142, 143, 144, 145, and 146), the third spring pattern (112, 113, 114, and 115), the fourth spring pattern (171 and 173), and the fifth spring pattern (181*a*, 181*b*, 182*a*, 182*b*, 185*a*, 185*b*, 186*a*, and 186*b*) that do not correspond to the first direction x are not stretched, or the stretching amount thereof may be very small compared with the spring pattern corresponding to the first direction x.

Figure 4:
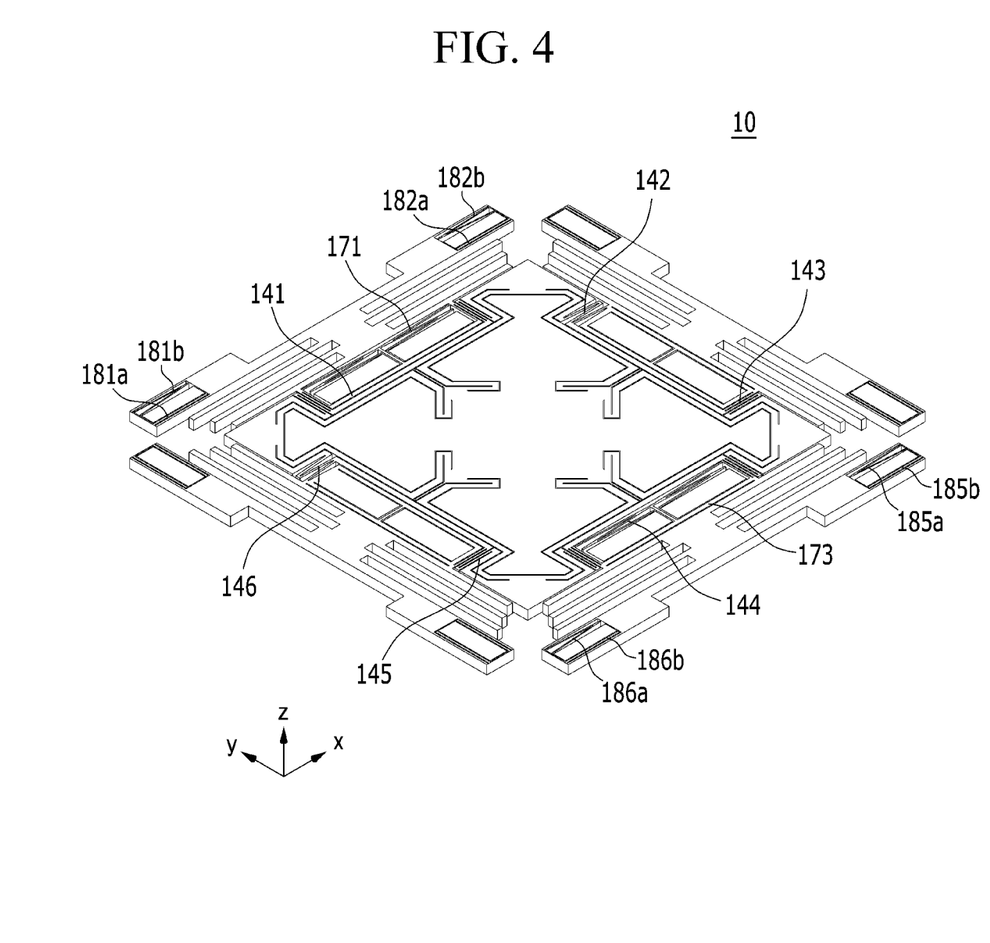
FIG. 4 is a perspective view illustrating a case in which an acceleration sensor moves in a direction opposite to a second direction.

FIG. 4 is a view depicting a case in which an acceleration sensor moves in a direction opposite to a second direction.

The acceleration sensor is moved in the opposite direction −y of the second direction y such that the moving electrode 10 is moved in the second direction y depending on the inertial force.

Referring to FIG. 4, as the moving electrode 10 is moved in the second direction y, it may be confirmed that the second spring pattern (142, 144, and 146), the fourth spring pattern 171, and the fifth spring pattern (181*b*, 182*b*, 185*a*, and 186*a*) are stretched, and the second spring pattern (141, 143, and 145), the fourth spring pattern 173, and the fifth spring pattern (181*a*, 182*a*, 185*b*, and 186*b*) are reduced.

In this case, the first spring pattern (131, 132, 133, 134, 135, and 136), the third spring pattern (112, 113, 114, and 115), the fourth spring pattern (172 and 174), and the fifth spring pattern (183*a*, 183*b*, 184*a*, 184*b*, 187*a*, 187*b*, 188*a*, and 188*b*) that do not correspond to the second direction y are not stretched, or the stretching amount thereof may be very small compared with the spring pattern corresponding to the second direction y.

Figure 5A:
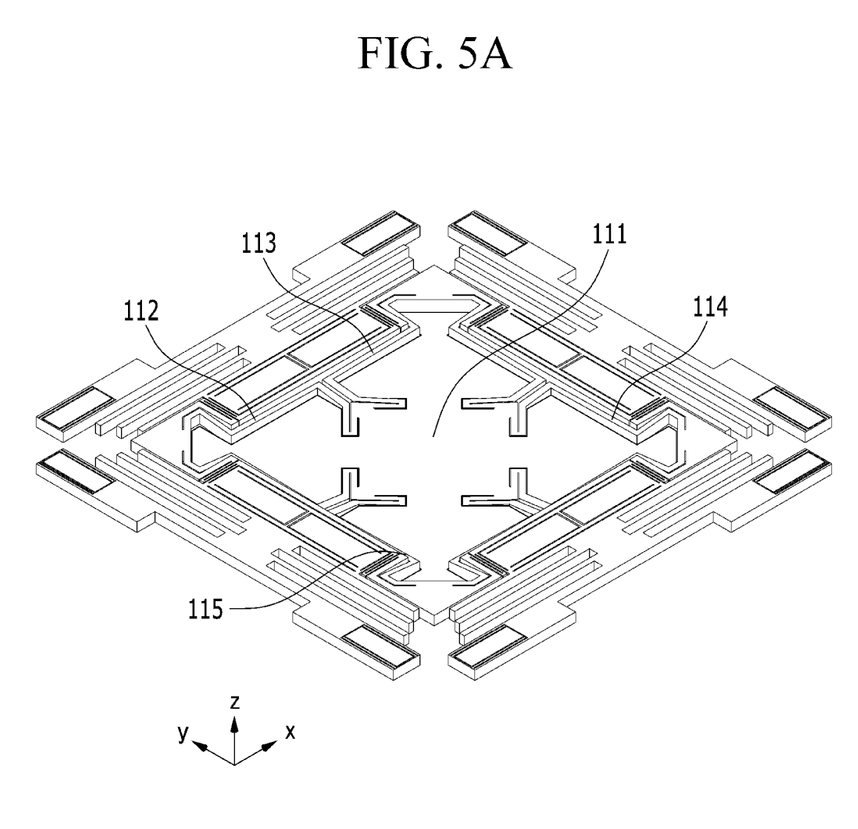
FIGS. 5A and 5B are perspective and side views, respectively, illustrating a case in which an acceleration sensor moves in a third direction.
Figure 5B:
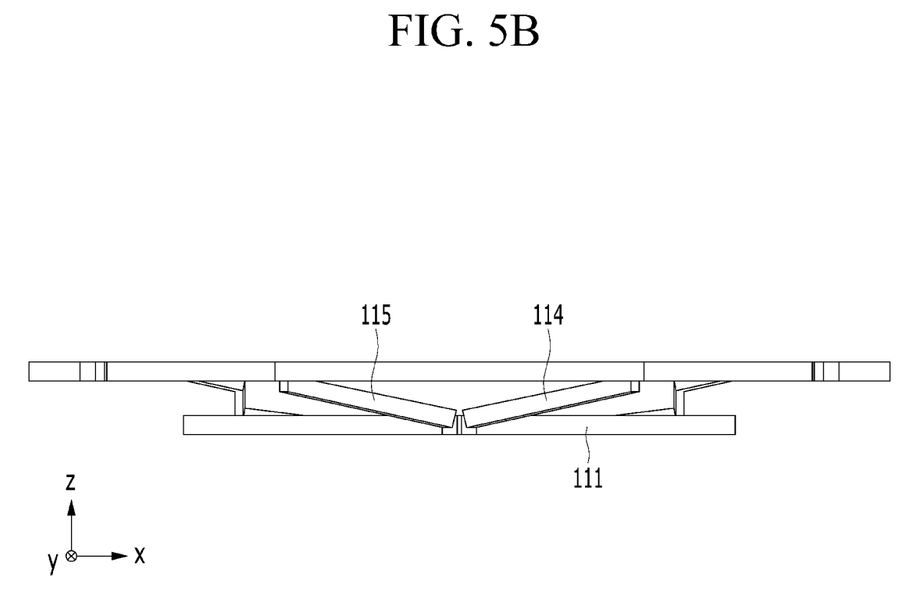

FIGS. 5A and 5B are views depicting a case in which an acceleration sensor moves in a third direction.

Since the acceleration sensor is moved in the third direction z, the moving electrode 10 is moved in the opposite direction −z of the third direction z depending on the inertial force.

Referring to FIGS. 5A and 5B, as the moving electrode 10 is moved in the opposite direction −z of the third direction z, the third spring pattern (112, 113, 114, and 115) is bent in the opposite direction −z of the third direction z.

In this case, the first spring pattern (131, 132, 133, 134, 135, and 136), the second spring pattern (141, 142, 143, 144, 145, and 146), the fourth spring pattern (171, 172, 173, and 174), and the fifth spring pattern (181*a*, 181*b*, 182*a*, 182*b*, 183*a*, 183*b*, 184*a*, 184*b*, 185*a*, 185*b*, 186*a*, 186*b*, 187*a*, 187*b*, 188*a*, and 188*b*) that do not correspond to the third direction z are not stretched or the stretching amount thereof may be very small compared with the spring pattern corresponding to the third direction z.

As described above referring to FIGS. 3 to 5B, when the moving electrode 10 is position-changed depending on the inertial force by corresponding to the acceleration sensor, the spring pattern having each directionality is only stretched in the corresponding direction and is not influenced for the other directions, or the influence thereof may be minimized.

The drawings referred to and the detailed description of the present invention disclosed are just exemplary in the present invention, and they are used for describing the present invention and are not used to limit a meaning or limit the scope of the present invention disclosed in the claims. Accordingly, those skilled in the art to which the invention pertains can easily understand that various modifications and equivalent embodiments may be possible. Therefore, a substantial technical protective range of the present invention will be determined based on a technical idea of the appended claims.

What is claimed is:

1. An acceleration sensor, comprising:
   a moving electrode extending in at least one of a first direction and a second direction perpendicular to the first direction, and including a plurality of planar patterns connected with each other; and
   an opposing electrode forming a capacitance with the moving electrode,
   wherein the plurality of planar patterns include:
   a first frame pattern;
   a first anchor pattern fixing the moving electrode to a surrounding structure;
   a first spring pattern connecting the first frame pattern and the first anchor pattern and having a stretching direction of the first direction;
   a second spring pattern connecting the first frame pattern and the first anchor pattern and having a stretching direction of the second direction;
   a wing pattern; and
   a third spring pattern connecting the first frame pattern and the wing pattern and having a stretching direction of a third direction perpendicular to the first and second directions, and
   acceleration is measured depending on a change of the capacitance.

2. The acceleration sensor of claim 1, wherein:
   the opposing electrode is in plural,
   the opposing electrode is selected depending on a measuring target direction among the first, second, and third directions, and
   the acceleration of the measuring target direction is measured depending on the change of the capacitance between the selected opposing electrode and the moving electrode.

3. The acceleration sensor of claim 1, wherein the third spring pattern has a shape enclosing an outer part of the wing pattern.

4. The acceleration sensor of claim 3, wherein the first frame pattern is connected with the first spring pattern in the first direction and is connected with the second spring pattern in the second direction.

5. The acceleration sensor of claim 4, wherein:
   the first anchor pattern and the first frame pattern are in plural, and
   the first anchor pattern is positioned between two adjacent first frame patterns.

6. The acceleration sensor of claim 5, wherein the plurality of planar patterns further include:
   a second anchor pattern fixing the moving electrode to the surrounding structure;
   a second frame pattern positioned between the second anchor pattern and the first anchor pattern corresponding to the second anchor pattern;
   a fourth spring pattern connecting the first anchor pattern and the second frame pattern; and
   a fifth spring pattern connecting the second frame pattern and the second anchor pattern.

7. The acceleration sensor of claim 6, wherein the second frame pattern includes a plurality of comb-tooth electrodes.

8. The acceleration sensor of claim 7, wherein the plurality of comb-tooth electrodes extend in the direction perpendicular to the direction connecting the first anchor pattern and the second anchor pattern.

9. The acceleration sensor of claim 8, wherein the plurality of planar patterns have the same material composition.

10. A method for manufacturing an acceleration sensor, comprising the steps of:
    forming a planar electrode layer; and
    patterning the planar electrode layer to form a moving electrode by using one mask,
    wherein the moving electrode extends in at least one of a first direction and a second direction perpendicular to the first direction and includes a plurality of planar patterns connected with each other, and
    wherein the plurality of planar patterns include:
    a first frame pattern;
    a first anchor pattern fixing the moving electrode to a surrounding structure;
    a first spring pattern connecting the first frame pattern and the first anchor pattern and having a stretching direction of the first direction;
    a second spring pattern connecting the first frame pattern and the first anchor pattern and having a stretching direction of the second direction;
    a wing pattern; and
    a third spring pattern connecting the first frame pattern and the wing pattern and having a stretching direction of a third direction perpendicular to the first and second directions.

11. The method of claim 10, wherein in the step of forming the moving electrode, an opposing electrode forming the capacitance with the moving electrode is formed together therewith.

12. The method of claim 10, wherein the third spring pattern is formed of a shape enclosing an outer part of the wing pattern.

13. The method of claim 12, wherein the first frame pattern is connected with the first spring pattern in the first direction and is connected with the second spring pattern in the second direction.

14. The method of claim 13, wherein:
    the first anchor pattern and the first frame pattern are in plural, and
    the first anchor pattern is positioned between two adjacent first frame patterns.

15. The method of claim 14, wherein the plurality of planar patterns further include:
    a second anchor pattern fixing the moving electrode to the surrounding structure;
    a second frame pattern positioned between the second anchor pattern and the first anchor pattern corresponding to the second anchor pattern;
    a fourth spring pattern connecting the first anchor pattern and the second frame pattern; and
    a fifth spring pattern connecting the second frame pattern and the second anchor pattern.

16. The method of claim 15, wherein the second frame pattern includes a plurality of comb-tooth electrodes.

17. The method of claim 16, wherein the plurality of comb-tooth electrodes extend in the direction perpendicular to the direction connecting the first anchor pattern and the second anchor pattern.

18. The method of claim 17, wherein the plurality of planar patterns have the same material composition.

* * * * *